Feb. 11, 1969     H. G. JOHNSON     3,426,841
HEAT EXCHANGERS HAVING PLASTIC COMPONENTS
Filed May 18, 1966

INVENTOR.
Herbert G. Johnson

United States Patent Office 3,426,841
Patented Feb. 11, 1969

3,426,841
HEAT EXCHANGERS HAVING PLASTIC COMPONENTS
Herbert G. Johnson, 17 N. Drexel Ave., Havertown, Pa. 19083
Filed May 18, 1966, Ser. No. 559,672
U.S. Cl. 165—178
Int. Cl. F28f 9/04; F16l 41/00, 7/00
7 Claims

ABSTRACT OF THE DISCLOSURE

This application discloses heat exchangers having plastic components and method of making them, particularly heat exchangers having tubes of cold-work-strengthened fiber-oriented tubes of plastic material which have very thin walls and relatively very large diameters to provide great heat exchange capacity with adequate strength in easily workable commercial sizes; and provides stable connections of the tubes to a tube sheet of compatible plastic material, particularly a connection comprising an interiorly tapered integral conformable sleeve on the tube sheet engaging a tube only at the end to provide for bending of the tubes with expansion, and the end of the sleeve being heat shrunk on the tube and fused to the end of the tube. Also a drum of compatible plastic material surrounding the tubes and having approximately the same length change with temperature change as the tubes so as to minimize heat-change stresses. Also drum heads of compatible plastic material.

---

This invention relates to heat exchangers having plastic components and method of making them, and has for an object the provision of improvements in this art.

The invention relates particularly to heat exchangers having plastic components for handling highly corrosive fluids and more particularly to this type of exchangers having minimum scaling or fouling of the heat exchange surfaces.

One example of the general type of heat exchangers with which the present invention is concerned is disclosed in the patent to Brown et al. (Dupont Co.) 3,228,456, issued Jan. 11, 1966. This shows tubes of a material like polytetrafluoroethylene, commonly referred to as PTFE or more frequently as "Teflon," secured in tube sheets, as of metal, by an adhesive filler or potting material such as a PTFE wax. Since PTFE is one of the least cementable known materials it is obvious that cemented joints are likely to fail. Since PTFE and materials having similar characteristics are subject to creep or memory deformation they cannot be roll-expanded in tube sheet holes like metal tubes, hence the attempt to make adhesive or potted joints.

PTFE in its primary form is a low strength material and extruded and sintered tubes have very low circumferential strength, even when the longitudinal strength is fairly high. Hence engineering design requires tubes of undesirably thick walls and comparably low heat transfer characteristics; also relatively small diameter tubes and a comparably large number of tubes for a given exchange value; and consequent high expense of manufacture of heat exchange units, especially since PTFE is a very expensive material even in its natural unfabricated state.

PTFE also has a very high thermal coefficient of expansion, for example, about five times that of copper and about seven times that of steel. This is another factor tending to make it impracticable to expand the ends of tubes of this material into tube sheet holes as is done with steel, copper and other metals. Along with the great change in diameter of the tube in the hole, there is a corresponding great change in the tube length tending to buckle the tube and break its seal in the tube sheet. This further accounts for the attempts to cement or pot the tubes in the tube sheet even in the face of the known low-cementable nature of the material.

PTFE has a very low coefficient of heat transfer per unit of wall thickness as compared to metals, hence it is desirable to use tubes with very thin walls. This, however, is a very difficult problem with natural PTFE and accounts for the use of tubes of very small diameter to permit the tube wall to be as thin as possible. It is known that the strength of his material can be greatly raised by mechanically working it in the solid state below its fusing temperature and that it can be treated to overcome its tendency to creep by memory toward its preworked condition by suitable post-working treatment which may be referred to as a "stabilizing" treatment. The solid-working treatment is similar to the cold-working of metals and is sometimes referred to as "cold-working" although it may be performed at temperatures considerably higher than room temperature for PTFE and certain other known plastic materials which fuse or gel but do not melt at any given temperature. This characteristic of PTFE and certain other materials together with means and method of one type for solid-forming or "cold-forming" and stabilizing them are disclosed in my Patent 3,172,928, issued Mar. 9, 1965. So far as is known, however, no proposal has been made for using thin walled solid-worked stabilized plastics in heat exchangers.

Accordingly, it is one of the particular objects of the present invention to provide a tube-type heat exchanger using corrosion and scale resistant plastic material, especially fluorocarbons, polyamides, polyesters, polystyrenes, polypropylenes, polyolefins, and the like in a more advantageous, efficient and economical manner than previously known.

Another object is to provide a tubular heat exchanger which provides for the practical use of plastic tubes of thinner walls, larger diameter and greater strength than previously known.

Another object is to provide a heat exchanger which is simple, easy to make and assemble, readily accessible, compact, light, fluid-tight, pressure and temperature resistant, and free from foreign material between the surfaces of similar materials or parts in the assembly.

Another object is to increase the efficiency of the heat transfer surfaces without a corresponding increase in the number of tubes or in the overall size and cost of the apparatus.

The above and other objects of the invention, as well as various features of novelty and advantages, will be apparent from the following description of certain exemplary embodiments, reference being made to the accompanying drawings, wherein.

Figure 1:
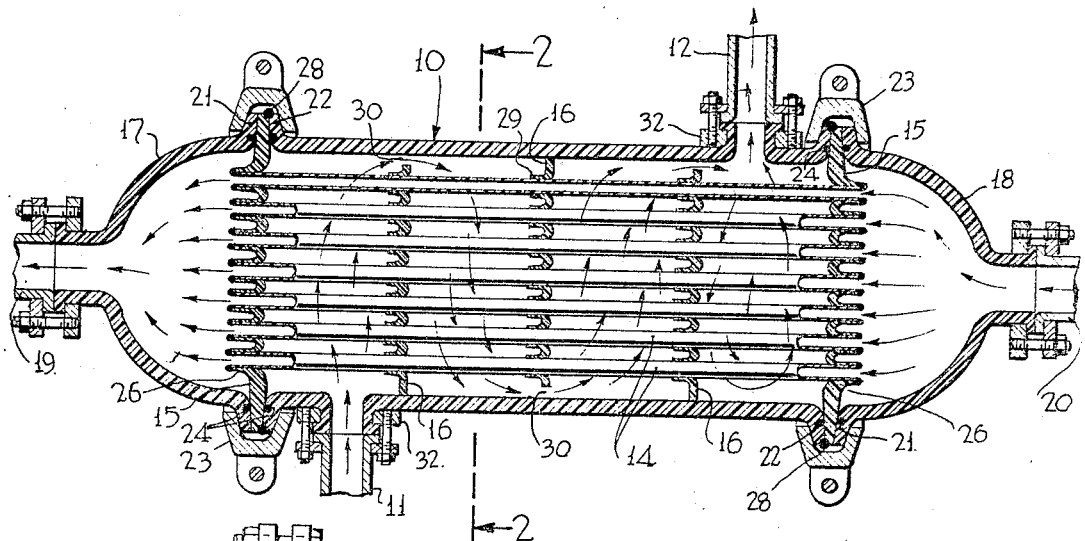
FIG. 1 is an axial section showing spaced-tube-sheet-and-tube type of heat exchanger embodying and made according to the present invention.

As shown in FIG. 1, an outer enclosing cylindrical intermediate drum or shell 10, which may be made of metal or plastic but preferably of a plastic similar to that used interiorly which is highly resistant to corrosion and scaling, is provided with flanged pipe nipple connections 11 and 12 for handling one heat exchange fluid which passes around interior tubes.

Interiorly of the drum there are disposed tubes 14 secured in holes in tube sheets or plates 15 and intermediately positioned in holes in baffle plates 16. Convex headers 17 and 18 having reduced flanged pipe nipple connections 19 and 20 are provided for handling a second heat exchange fluid which passes through the tubes.

The headers and drum are shown to be connected in circumferential joints having flanges 21 and 22, respectively, which secure the outer edge of the tube sheets or plates 15 between them and are secured together by channelled bands 23 which can readily be secured together like hose clamps. O-rings 24 may be interposed between adjacent faces for a seal.

The margins of the tube plate holes into which the tubes are inserted and secured are flanged to form deep-lipped conical or bell-shaped collars or sleeves 26 which tightly engage around the tube ends and are fused or dip-sealed thereto, as shown at 27, the tubes and tube sheets being of similar compatible or the same material which will fuse integrally, as is possible with the materials dealt with herein. Preferably the end of the collar or sleeve is brought to a thickness substantially the same as that of the wall of the tube to provide even fusing. The sleeves are quite long—several times the thickness of the tube sheet or plate—and stand clear of the tubes in the plane of the tube sheet so as to allow the tubes to bend when they expand in length with heat to avoid putting undue stresses on the tube-sheet joints. The ends of the tubes and sleeves at each of the assembly are co-planar so that by holding the assembly in vertical position all dip joints can be made simultaneously.

The tube sheets and drum are also preferably formed of compatible inter-fusible material and are fused together at their edges, as at 28. By using the same or compatible materials the changes in length by changes in temperature will be about equal and minimize stresses.

The headers 17 and 18 could also be compatible with the tubes, tube sheets, and shell but there is not as much need to make integral connections here as with other parts since different fluids are involved and, moreover, there are advantages in having separable end joints, whether or not the headers are made of the same or compatible material as the other parts.

Figure 2:
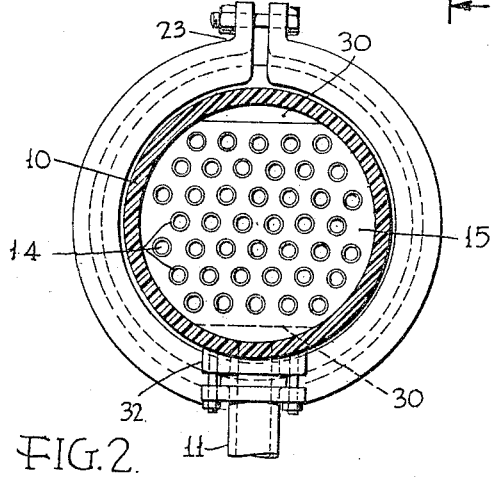
FIG. 2 is a transverse section taken on the line 2—2 of FIG. 1.
Figure 3:
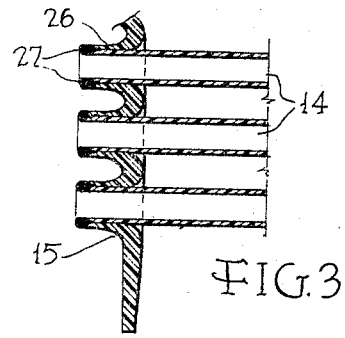
FIG. 3 is an enlarged partial section of a tube and tube sheet connection region.

FIG. 1 shows the baffle plates 16 to be flanged or sleeved, as at 29, like the tube sheets to form embracing skirts, collars, or sleeves on the tubes and they thus add to the area available for heat transfer. The sleeves 29 have a length several times that of the thickness of the baffle thickness and are tightly secured on the tubes, as by heat shrinkage, to establish large contact surfaces which provide great heat transfer capacity between the tubes and baffle plates. The baffle sheets are cut away at alternate sides, as shown at 30 in FIGS. 1 and 2, to cause the fluid to flow through in zig-zag fashion.

Figure 4:
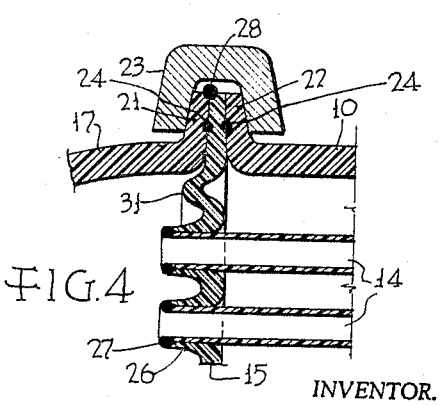
FIG. 4 is an enlarged partial longitudinal sectional view showing a modified form of tube sheet and its connection with shell and header flanges.

FIG. 4 shows how the tube sheets may be formed with annular flexing elements 31 to aid the axial expansion of the tubes secured therein.

FIG. 1 shows how a tapped metal ring 32 may be secured to the flanged Van Stone type pipe connections, as at 11, 12, 19, or 20. This is explained in my patent referred to above.

Figure 5:
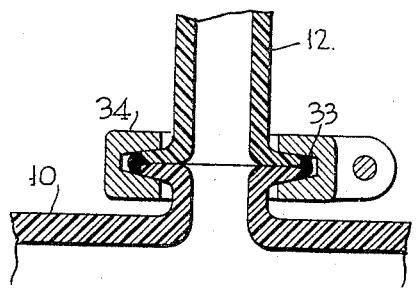
FIG. 5 is an enlarged section showing a modified form of connection between a shell nipple and pipe.

FIG. 5 shows a modified pipe connection in which plastic pipe flanges are fused together, as at 33, and clamped, as by a hose-type channel clamp 34, similar to the clamp 23 shown in FIG. 1 for the drum and head connection.

Figure 6:
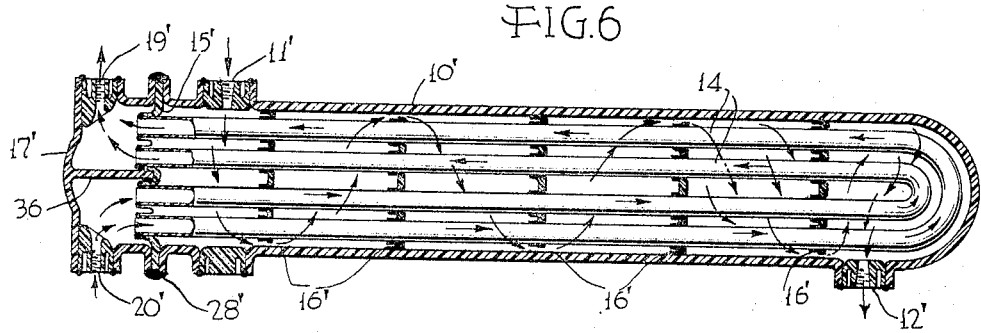
FIG. 6 is a view similar to FIG. 1 showing a modified form of heat exchanger having only a single tube plate.

FIG. 6 shows a modified form of heat exchanger which provides U-shaped tubes 14' which are secured at both ends to a single tube sheet 15' which is fused, as at 28', to the flanges of a drum 10' having a closed end and to the flanges of a header 17' having a divider plate 36 separating an inlet chamber having an inlet pipe 20' from an outlet chamber having an outlet pipe 19'. The drum-header-tube-plate flange connection may be reinforced by clamping means, as in the first form, if desired. The drum has an inlet pipe connection 11', an outlet pipe connection 12', and baffles 16'. This construction relieves end thrust of the tubes on the tube sheet and the connections with their sleeves due to axial change in length of the tubes with temperature changes.

Figure 7:
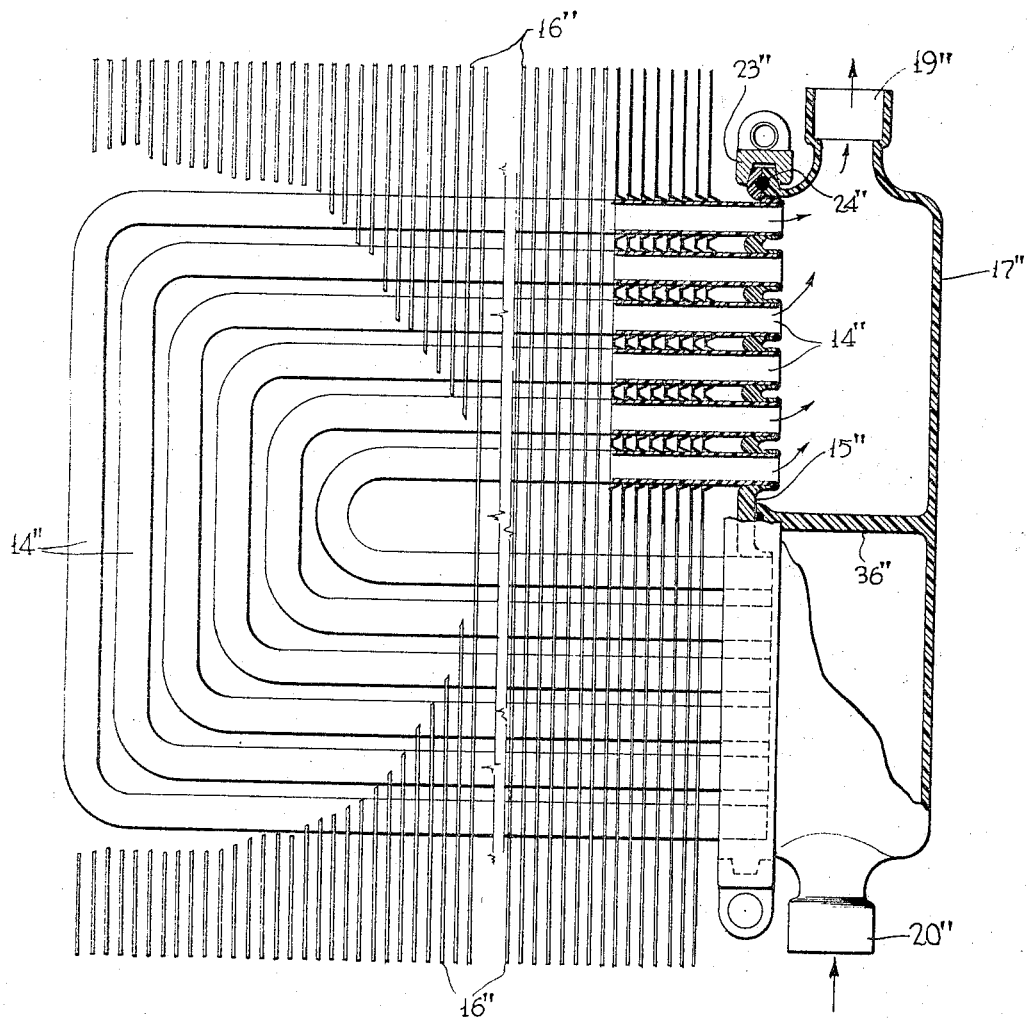
FIG. 7 is a view similar to FIG. 7 showing another modified form having a single tube sheet.

FIG. 7 shows a modification which is similar to that of FIG. 6 in having a single tube sheet but which is different in omitting the casing for a second fluid, leaving the tubes and their baffles exposed to the air. The plastic tubes are designated as 14'', the tube plate as 15'', the header 17'' having a divider 36'' between inlet chamber with pipe 20'' and outlet chamber with pipe 19'', and baffles 16''. The baffles may be of the same material as the tubes and tube plate but may be of a more highly conductive material, such as a metal like aluminum, copper, etc., if desired. The same kind of sleeved joints between tubes and tube sheets are provided; and the baffles have extruded sleeves fitting tightly on the tubes. The header flange may be fused to the outer edge of the tube sheet, as in FIG. 6; or may have an O-ring 24'' and clamp ring 23'', as in FIG. 1, the latter being shown.

An advantage of the present invention is found in the use of pretreated tubes to greatly increase their pressure carrying capability over ordinary plastic tubes of the same chemical formulation with concurrent great reduction in wall thickness so as to decrease their resistance to heat flow across the tube wall.

The advantages of biaxial orientation of the fibers of thin films or sheets of certain plastics, such as polyamides (including "nylon"), fluorocarbon polymers (including "Teflon," etc.), polyesters, polystyrenes, polyolefins, polypropylenes, and the like have been applied for certain uses. By balanced and controlled stretch in axial and transverse directions the physical properties are very greatly enhanced. In the case of PTFE, orientation can increase the tensile strength to several times that of the unoriented film or sheet. And polypropylene strip, for example, can by fiber orientation have its longitudinal strength increased to ten times that of the unoriented extruded film.

Biaxially oriented plastic tubing is a relatively new development (see my patent referred to above) and by the present structure and method of assembly, particularly for securely connecting the ends of the tubing, its superior physicals are utilized in tubular heat exchange equipment.

Even the less expensive non-axially (circumferentially) oriented plastic provides a decided improvement over non-oriented tubing heretofore used, although on the basis of improved strength alone the improvement would be limited to approximately doubling the permissible working pressure or halving the wall thickness for any given pressure due to the physical law that hoop stress under a given internal pressure is double the axial stress.

Actually, the structure is improved, even with unoriented tubing, because of the permanent and conformable stress-relieving end connections hereby provided for the ends of the tubes.

Suitably balanced biaxial orientation will optimize the directional strengthening of the plastic molecular structure to give maximum increase in internal-pressure stress-carrying ability of the tubing. This is about five times that of normal unoriented tubing—in the case of polypropylene, an increase from about 5000 p.s.i. to about 25,000 p.s.i. in tensile strength.

And for a given strength, this would permit the practical use of tubing with a wall only one-fifth as thick, that is, in the case cited in the Brown et al. patent referred to above, a tube having a wall thickness of only 2% of the tube diameter instead of 10% of the tube diameter. This would result in saving 80% of the tube material and in reducing the thermal resistance across the tube wall to one-fifth its former resistance. Or, the number of tubes might be reduced to one-fifth so long as the tube wall resistance is controlling as to the flow of heat.

As another possibility, by strengthening the tube material by orientation it is possible to use tubes five times the previous diameter without reduction in pressure, temperature or thickness and this does not require an increase in heat transfer either. In other words, it is possible to use tubes of any practical diameter up to the largest in present common use, i.e., 1⅜″ or 1375 mils, and still retain the advantages of using plastic. This opens up entirely new fields to the heat exchange designer.

A special feature of the present invention is in the ability to dip the ends of the tube and tube-sheet sleeve assembly and make all the connections simultaneously or at one shot. Reference to dipping includes hot plate, induction heaters, welding torches, and the like.

Another feature is that the forming operations are such that the plastic memory or creep reversion to original shape is utilized to further the aims sought by the invention. For example, during fusing of the tubes to the sleeves the tendency of the sleeves will be to shrink in diameter and tighten on the tubes, the tubes being assumed to be supported, as by internal mandrels, thus creating ideal conditions for thermal-pressure welding or fusing over the entire heated (immersed, it may be) length. The same practice of fusing parts together, in principle, may be employed in securing the shell flange to the tube sheet, in securing the fluid conducting pipes to the pipe connections (FIG. 5) or in securing the baffles to the tubes.

By the present invention it is possible to have all parts—tubes, tube sheets, shells, headers, baffles, etc.—of the same or mutually compatible related materials and to pass the corrosive or surface-fouling (scaling) fluid either through or around the tubes, as may be most practicable or desirable. It is usually more desirable to present the outer surfaces of the tubes to the scale-producing fluid since this does not reduce the fluid flow ratio as much as it would if it left a deposit inside the tubes, and there is more chance that tube flexing would remove more of the scale from the outside. The headers or shells may selectively be exchanged for more common and less expensive materials, depending on whether one of the fluids is less corrosive or less scale-forming in character. The integrated plastic tube-and-tube-sheet unit assures that in all cases one of the tube surfaces, outer or inner, will be available for contact by corrosive fluid and will have a long life expectancy without separation or leakage.

In the spaced tube sheet and shell type of constructiond (FIG. 1), the use of a shell of the same type as that of the tubes tends to equalize the differential expansion of shell and tubes and thus minimizes stress on the end joints of the tubes with the tube sheets.

It is thus seen that the invention provides improved plastic heat exchanger constructions as well as improved methods of forming them, particularly including improved integrating joints which make it feasible to assemble different parts of the same or similar compatible plastics with security against separation or leakage and with permissible movement from expansion and contraction without joint separation. It particularly makes it feasible to use solid-worked (cold-worked) memory type plastics with their much greater strength, permitting the use of much thinner-walled and more highly conductive tubes and tubes of much larger and more practicable diameters. The heat-shrunk joints further add to the utilization of memory-type pre-stabilized plastics.

The tube sheets are easily formed by solid-extrusion operations to form the elongated sleeves without drilling out material to form holes. These sleeves are of a length many times the thickness of the tube sheet and are solid-formed and stabilized for heat-shrinkage on the tubes at the fuse or weld zone of the integrated joints. They are flexible to accommodate tube bending and at the ends are reduced to approximately the wall thickness of the tubes to make the optimum fused joints.

While certain embodiments of the invention have been described to illustrate the principles of the invention, it is to be understood that there may be other modifications and various changes within the general scope of the invention.

I claim:

1. A heat exchanger, comprising in combination, a plurality of biaxially-fiber-oriented cold-work-strengthened plastic tubes having very thin walls relative to diameter, and a compatible plastic tube sheet having a plurality of tube holes individually embracing said tubes, said tube sheet having projecting biaxially-fiber-oriented cold-work-strengthened sleeve elements extending from the holes therein each surrounding a tube, and the ends of said tubes having integral fused connections with the ends of said sleeves.

2. A heat exchanger as set forth in claim 1, further characterized by the fact that the body of said tube sheet is thicker than the wall of said tubes and that said sleeves are reduced in wall thickness along their length with their base walls the thickness of the tube sheet and their end walls approximately the same thickness as the wall of said tubes.

3. A heat exchanger as set forth in claim 1, further characterized by the fact that said tubes and tube sheet are composed of related mutually fusible memory-type plastic material with said sleeves tightly embracing the outer surface adjacent the ends of said tubes.

4. A heat exchanger as set forth in claim 1, further characterized by the fact that said tube sheet is provided with a circumferential flexing element to minimize joint breaking forces on the tube and sleeve joints.

5. A heat exchanger as set forth in claim 1, which further includes a flanged compatible plastic fluid-enclosing and tube-enclosing drum body having its flange connected with the outer edge of said plastic tube sheet.

6. A heat exchanger as set forth in claim 1, further characterized by the fact that spaced heat exchange sheets with holes having axially extending sleeves are tightly secured by their sleeves on said tubes to hold them in properly spaced relationship and to add to their heat exchange capacity between fluids.

7. A heat exchanger as set forth in claim 1, which includes a flanged compatible plastic fluid-enclosing header body having its flange connected with the outer edge of said plastic tube sheet.

References Cited

UNITED STATES PATENTS

| | | | |
|---|---|---|---|
| 3,053,726 | 9/1962 | Larson et al. | 156—304 |
| 2,806,718 | 9/1957 | Cook et al. | 165—178 |
| 2,807,445 | 9/1957 | Gardner | 165—178 X |
| 2,816,739 | 12/1957 | Stoehr | 165—178 X |
| 3,228,456 | 1/1966 | Brown et al. | 165—1 |
| 3,315,740 | 4/1967 | Withers | 165—178 X |
| 2,240,537 | 5/1941 | Young | 165—178 X |
| 3,001,766 | 9/1961 | Laist | 165—178 X |
| 3,237,297 | 3/1966 | Rowland | 29—470 |

ROBERT A. O'LEARY, *Primary Examiner.*

T. W. STREULE, *Assistant Examiner.*

U.S. Cl. X.R.

156—304